United States Patent
Ben-Shachar et al.

(10) Patent No.: US 6,674,459 B2
(45) Date of Patent: Jan. 6, 2004

(54) NETWORK CONFERENCE RECORDING SYSTEM AND METHOD INCLUDING POST-CONFERENCE PROCESSING

(75) Inventors: Ido Ben-Shachar, Redmond, WA (US); Ivan J. Leichtling, Redmond, WA (US); Leonard Alan Collins, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/032,668

(22) Filed: Oct. 24, 2001

(65) Prior Publication Data

US 2003/0169330 A1 Sep. 11, 2003

(51) Int. Cl.$^7$ ................................................. H04N 7/14
(52) U.S. Cl. ................................ 348/14.09; 348/14.08; 348/14.12
(58) Field of Search ........................... 348/14.01–14.08, 348/14.09, 14.1, 14.11, 14.12, 14.13; 370/260; 709/244; 345/753, 755, 751; 379/76; H04N 7/14

(56) References Cited

U.S. PATENT DOCUMENTS

| | | | | | |
|---|---|---|---|---|---|
| 4,588,857 | A | * | 5/1986 | Arsem | 379/75 |
| 5,586,172 | A | * | 12/1996 | Sakurai et al. | 379/67 |
| 5,710,591 | A | * | 1/1998 | Bruno et al. | 348/14.09 |
| 6,226,668 | B1 | * | 5/2001 | Silverman | 709/204 |
| 6,233,317 | B1 | * | 5/2001 | Himan et al. | 379/88.05 |

FOREIGN PATENT DOCUMENTS

| | | | | | |
|---|---|---|---|---|---|
| JP | 403225642 | A | * | 10/1991 | G11B/7/26 |
| JP | 407014016 | A | * | 1/1995 | G06K/17/00 |
| JP | 408023526 | A | * | 1/1996 | H04N/7/14 |
| JP | 02000350173 | A | * | 12/2000 | H04N/7/14 |

OTHER PUBLICATIONS

VOLKER et al., *A Light–Weight Repair Protocol for the Loss–Free recording of Mbone Sessions*, IEEE Computer Society, 21$^{st}$ International Conference on Distributed Computing Systems Workshops, Mesa, Arizona (Apr. 16–19, 2001).

LAMBROS et al., *The Multicast Multimedia Conference Recorder*, IEEE Computer Society, 7$^{th}$ International Conference on Computer Communications and Networks, Lafayette, Louisiana (Oct. 12–15, 1998).

HOLFELDER, W., *Interactive remote recording and playback of multicast videoconferences*, Computer Communications, Prakische Informatik IV, Mannheim, Germany.

* cited by examiner

Primary Examiner—Melur Ramakrishnaiah
(74) Attorney, Agent, or Firm—Leydig, Voit & Mayer, Ltd.

(57) ABSTRACT

In a recorded network conference, a post-conference process is implemented to transcribe stored raw conference data into a viewable, standard format recording. The post-conference process postpones transcribing tasks until after the conference has ended. During the conference, raw conference data streams are stored directly in a compressed format used for network transmission. The post-conference process can be initiated based on one or more parameters to optimize use of resources. Possible parameters include conference schedules, CPU usage and availability for transcribing, and remaining storage capacity. In an embodiment, a recording unit joins the conference over the network in the manner of an attendee. The recording unit "listens" and blindly records the data, and later performs the post-conference process. In an embodiment, the transcribed recording is burned onto a CD-ROM and delivered to the conference attendees.

37 Claims, 8 Drawing Sheets

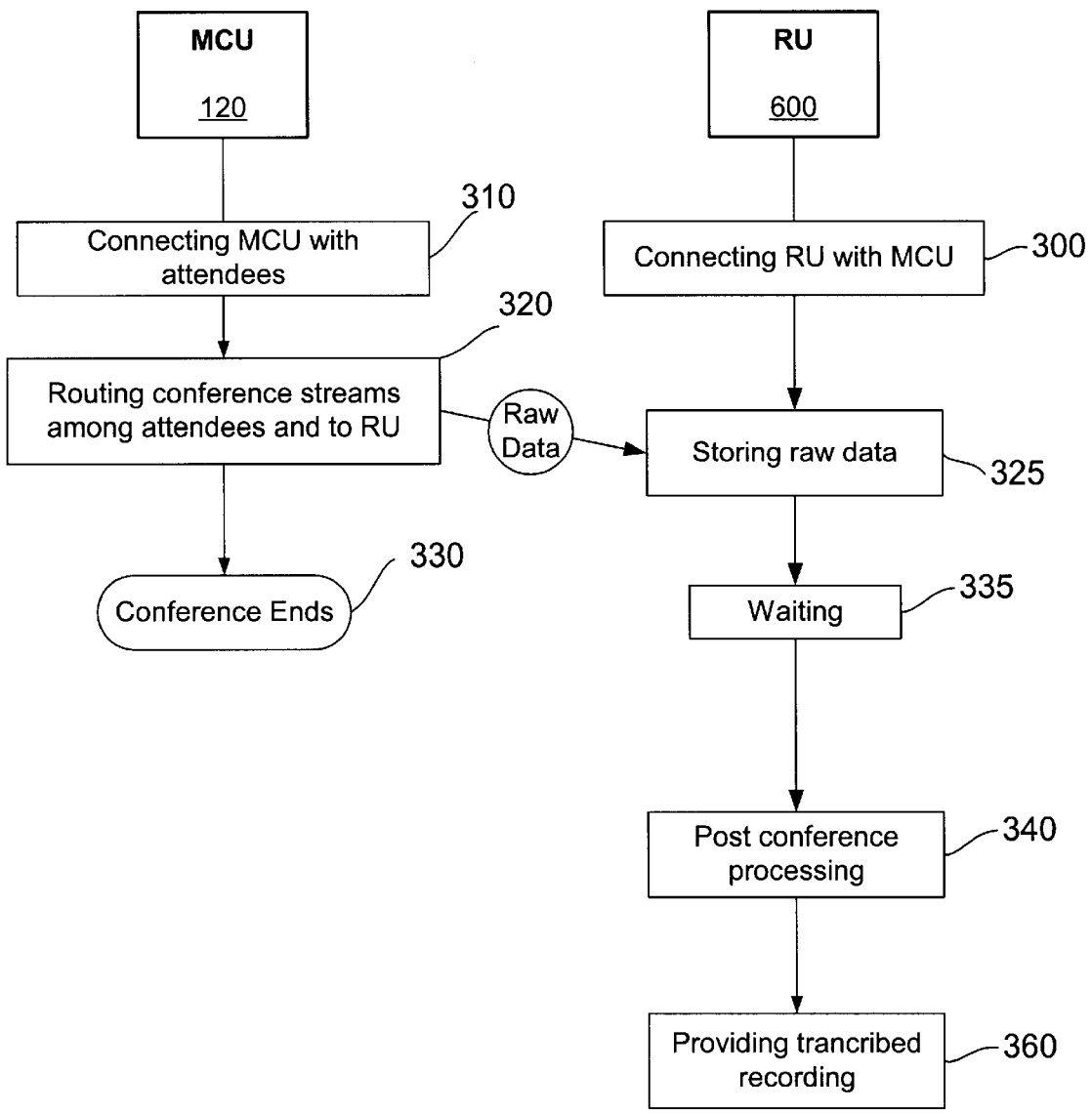

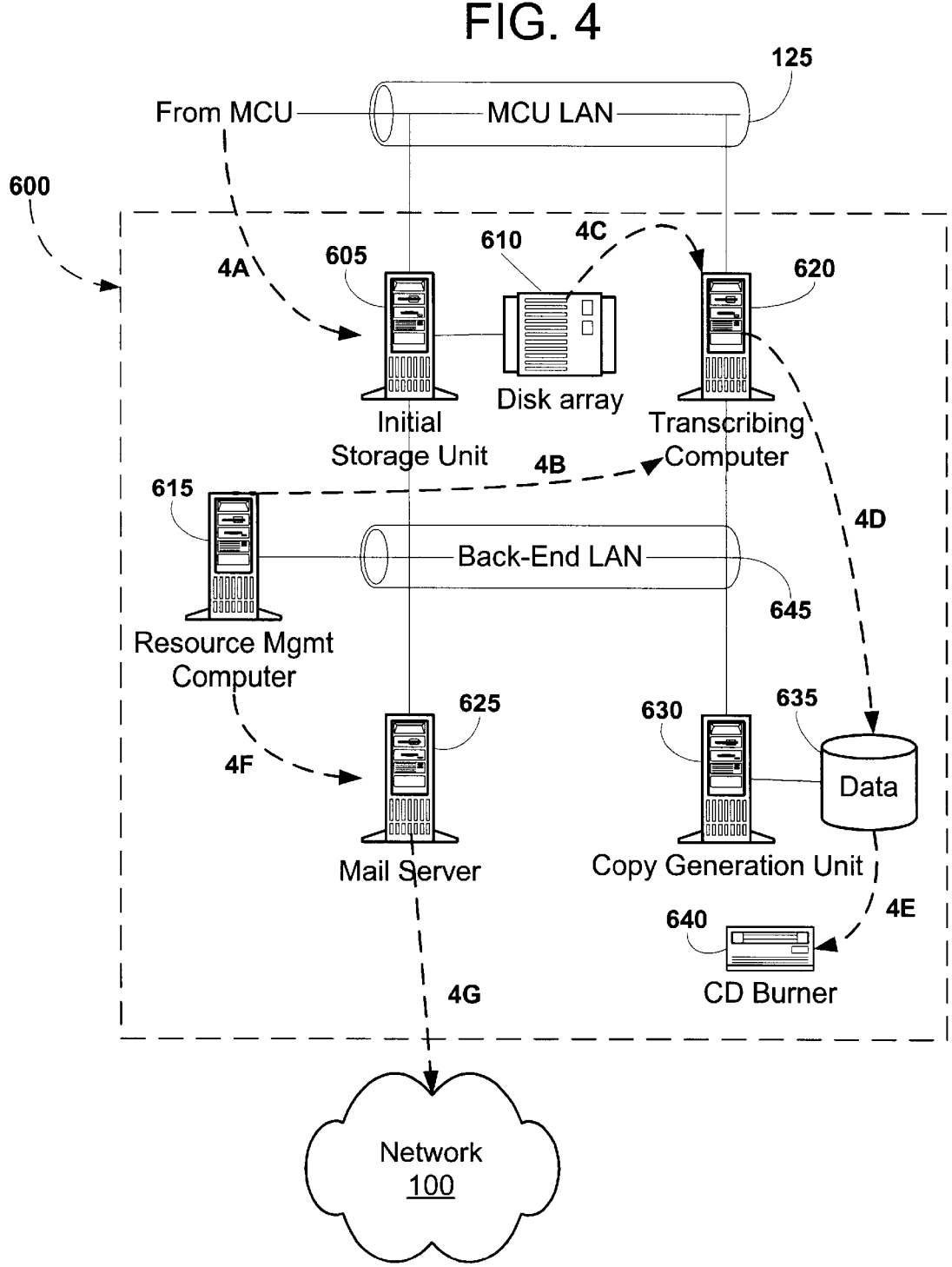

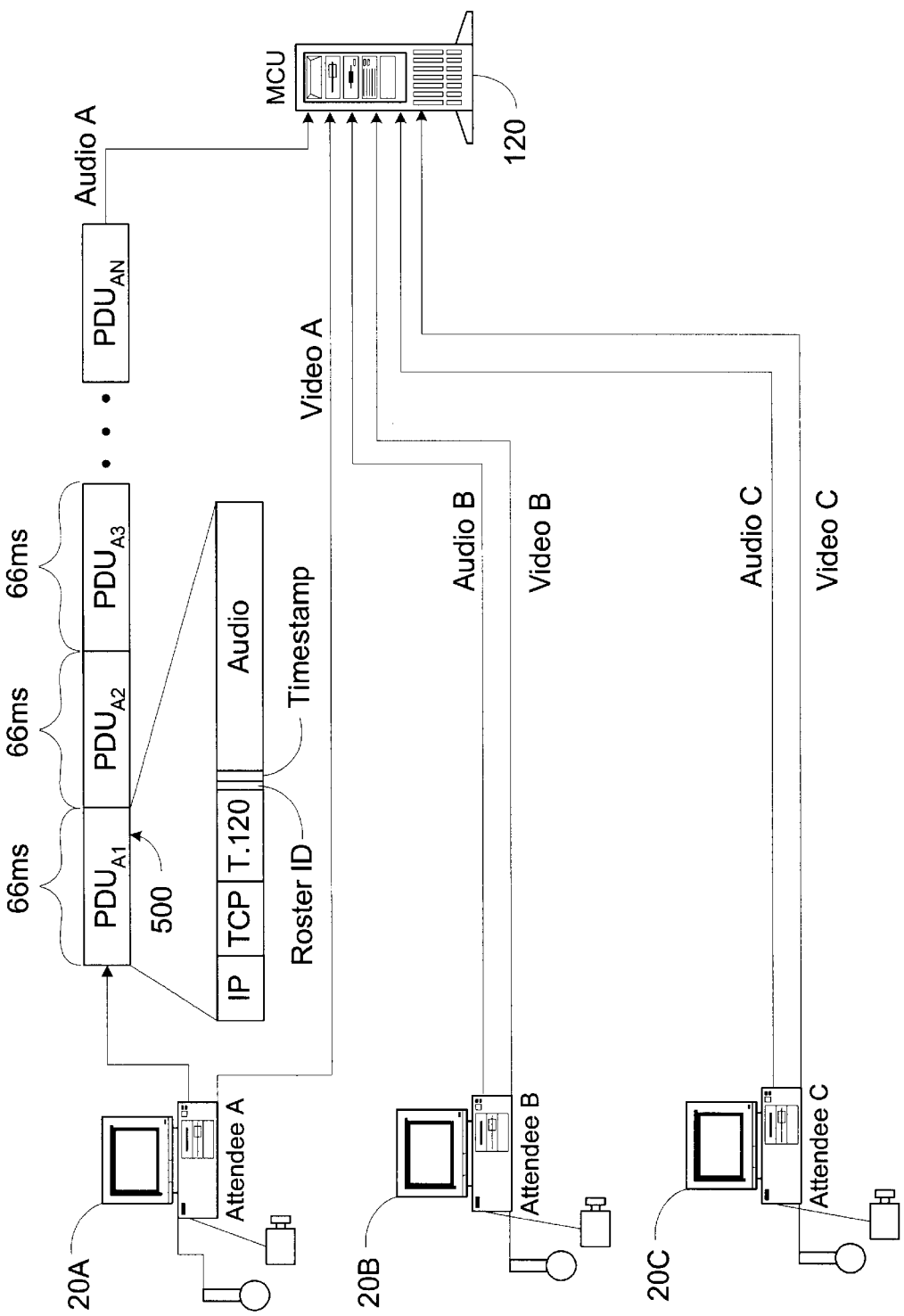

NETWORK CONFERENCE RECORDING SYSTEM AND METHOD INCLUDING POST-CONFERENCE PROCESSING

TECHNICAL FIELD

This invention relates generally to computer networks and more particularly relates to a system and method for recording a network conference.

BACKGROUND OF THE INVENTION

Multipoint online videoconferences have increased in popularity as an efficient way to conduct meetings. Conferencing systems are available to conduct conferences over local area networks (LANs) or wide area networks (WANs), such as the Internet. Online service providers are available to arrange such conferences over the Internet.

A conference includes the exchange of data streams containing audio, video and sometimes drawings, documents, or other application data among two or more "attendees" client computers. Each attendee computer sends respective audio and video streams to a host or conference server, which, in turn, distributes the data streams as appropriate among all of the attendee computers to create an interactive conference experience. Conferences are typically administered through a centralized conference server generally known as a Multipoint Control Unit (MCU). The MCU is typically allocated by a service provider who has prearranged the online conference. The attendee computers sign onto the MCU at the designated conference time. Ideally, multiple conferences may be handled simultaneously by a given MCU.

Of course, it is established practice to compress conference video and audio streams for transmission over the network to promote network efficiency. As used herein, the terms "raw data" and/or "wire format" refers to a compressed, packetized data format used during network transmission, although it should be understood that the term is not limited to transmissions over land based networks, but may include wireless networks as well.

It has been desirable to record conferences for later playback. This may be an optional service of the conference provider. In general, where a meeting is optionally designated as a "recorded meeting," the MCU takes steps to record the meeting at a storage device. Unfortunately, conventional recording systems for multipoint conferences have been problematic due to high processing demands of transcribing the streams to a readily playable format. More specifically, so that conference participation is not complicated by a need for special software, it is sometimes desirable to provide a conference recording which has been encrypted according to a ready-to-play streaming media format (hereinafter "standard format") compatible with an associated standard multimedia player. Exemplary standard formats include MPEG, Apple's Quicktime, and Windows Media Advanced Streaming Format (ASF), and compatible players are easily obtainable, such as by download over the Internet. Each such player implements an associated compression/decompression (codec) algorithm to encode and decode audio and video data.

In previous systems, the generation of a recording has been known to overburden the MCU processor, impeding the performance of real-time communication tasks. More specifically, one known system the MCU has attempted to generate a playable recording by transcribing the streams into a standard format in real time during the conference, prior to storage. This transcribing activity typically involves several processing-intensive tasks. For example, each of the audio streams must be decoded from the compressed wire format used for transmission. The decompressed audio streams were then mixed to form a single audio track, requiring the loading and running of appropriate digital signal processor (DSP) mixing software. Additionally, the mixed audio stream was then re-encoded together with a selected video stream into a standard format file. The MCU then writes the transcribed recording to a connected storage device, such as a hard drive. Unfortunately, each of the transcription tasks consumes significant processing resources.

It should be understood that the primary function of the MCU is to administer the routing of streams in "real-time" during the conference. Accordingly, the MCU must have adequate processing resources to keep up with the stream-routing tasks during the conference. However, under the conventional recording system, the MCU processor must concurrently perform the tasks of decoding, mixing, and re-encoding to generate the transcribed recording.

Disadvantageously, the MCU conferencing and recording services are not very scalable under the conventional recording system. The number of conferences and conference participants increases the number of possible incoming audio and video streams which the server must receive and distribute, but in addition, the transcription processing tasks multiply with the number of attendees. For example, in a conference with ten attendees, the processor will typically run a separate thread for each attendee to decode, mix and re-encode the respective audio streams.

Likewise, the conferencing capacity of the MCU is limited by the use of processing resources to transcribe recording data. The number of conferences and attendees which can be administered by the MCU is limited due to a need to reserve adequate processing resources to also handle the recording transcription tasks. More specifically, the MCU is able to handle fewer conferences and attendees than if no transcribing were being performed during the conference. This results in a need for more MCUs to handle a given amount of conferencing activity.

Also, the viewing quality of the conference may be compromised if the MCU processor is overburdened during the conference by tasks independent from the routing process. In particular, the conference data distributed to the attendee clients may be late and/or choppy if the MCU cannot keep up with its stream routing tasks.

In view of the aforementioned problems with scalability and transmission quality, a need exists for a recording method and system which minimize the processing tasks at a server during data transmission. In particular, it is desirable to provide a conference recording method and system which enables transcription tasks associated with recording to be processed independently and separately from communication tasks, both physically and temporally.

SUMMARY OF THE INVENTION

In order to generate a recording of a conference without increasing the processing burdens of a computer which administers communications among conference attendees, the present invention provides a storage device that stores only raw, compressed data, and wherein the necessary transcription processing performed after the meeting and before the playback. At a time after the meeting has concluded and prior to playback, the raw meeting data is processed into a playable standardized file format.

In an embodiment, a separate recording unit is provided. In an embodiment, the recording unit connects to the conference in a manner similar to an attendee to "listen in" and blindly record the conference data. The recording unit is dedicated to tasks associated with creating a conference recording. Like an attendee computer, the recording unit receives all of the conference audio and video data from the conference server.

By removing the transcribing function from the conference server, the conference server is freed from tasks which it previously handled. The processing capacity of the conference server can thus be dedicated to conference communication tasks. This advantageously results in increased server performance and/or increased capacity to handle an increased number of conferences and/or participants.

More specifically, the recording unit relieves the conference server of burdens associated with compiling a recording during the meeting, such as decompressing the audio streams from all of the computers, mixing audio streams, recompressing the audio, transcribing the data to a playable recording, and writing the recording file to a storage device. The recording unit postpones these tasks until after the conference.

The functions performed by the recording unit enable the conference server to merely coordinate the flow of compressed data streams among the computers of the meeting participants and to the recording unit. No need exists for the conference server to perform any processing associated with recording, including decompression, compression and audio mixing. Notably, by eliminating a compression cycle previously performed at the conventional conference server during the conference, the recording system and method of the invention avoids an associated degradation of the data.

The post-conference allows a high degree of flexibility in the content and format of the multimedia files ultimately generated. For example, separate files can be generated containing audio and/or video of any single attendee, selected attendees or all attendees. Moreover, separate files can be generated according to different standard formats and/or according to various quality levels.

An advantage of the present invention is that it provides a system and method of generating a network conference recording which reduces processing that must take place concurrently with a viewing of the conference.

Another advantage of the present invention is that it provides a system and method of generating a network conference recording which yields an improved conference experience to client attendees.

A further advantage of the present invention is that it provides a system and method of generating a network conference recording which yields an improved playback experience to viewers of the recording.

An additional advantage is to minimize latency and choppiness of the audio and video received played by conference attendees during the conference.

Another advantage of the present invention is that it provides a system and method of generating a network conference recording which minimizes losses in data resolution associated with compression.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3a is a flow chart illustrating an exemplary process for conducting and recording a conference;

FIG. 3b is a flow chart illustrating in expanded form the post-conference processing indicated as a step of FIG. 3a;

FIG. 4 is a schematic diagram of an exemplary system for performing the post-conference operations;

FIG. 5 is a schematic diagram illustrating exemplary streams of audio and video in raw, wire format as over respective channels corresponding to attendee computers A, B and C to the MCU, an exemplary audio packet of attendee A being shown in expanded detail.

DETAILED DESCRIPTION OF THE DRAWINGS

Figure 1A:
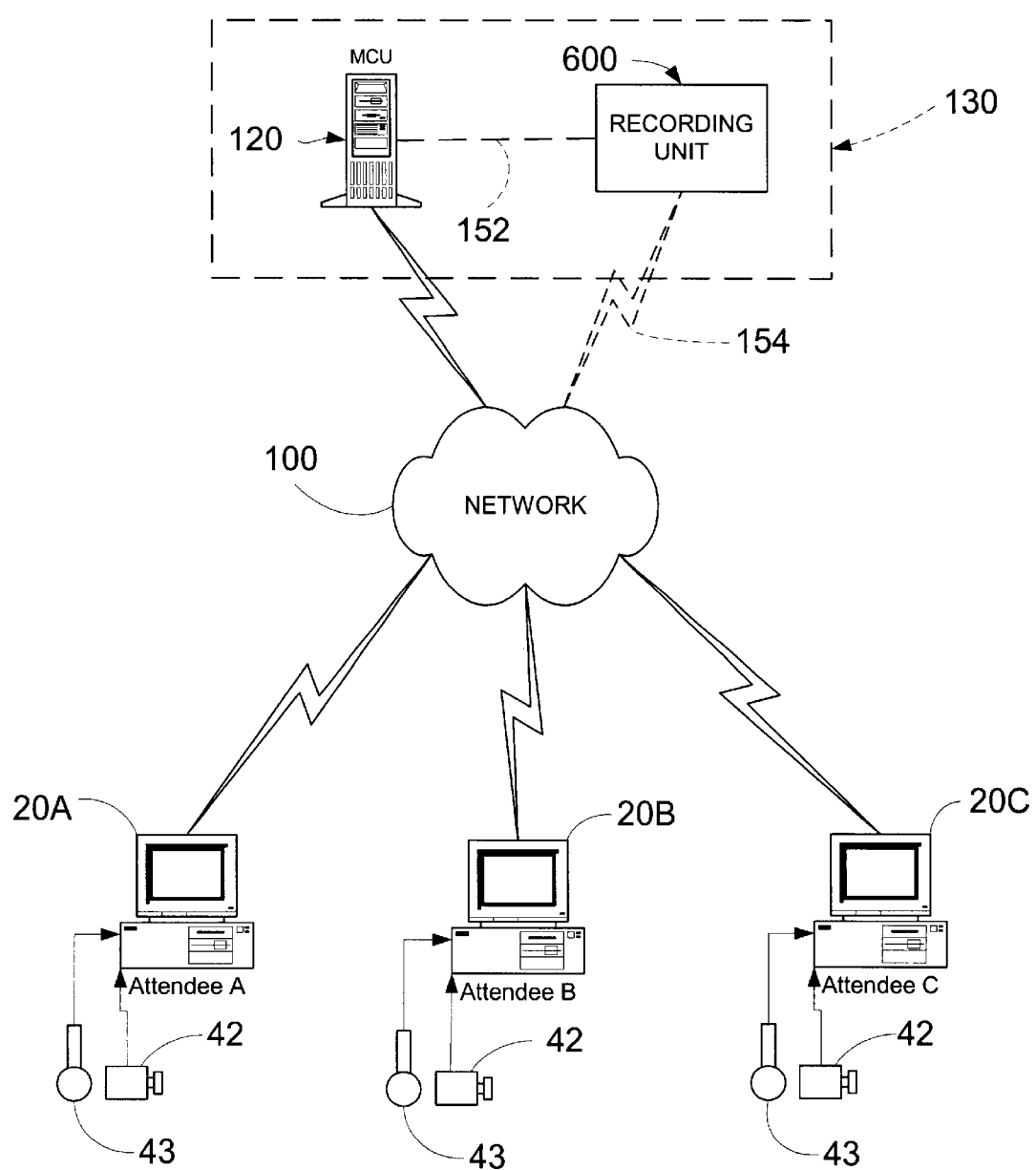
FIG. 1a is a schematic diagram illustrating a client-server system including a conference server which directs conference communications among a plurality of attendee computer clients and a recording unit client over a network.

Turning to the drawings, wherein like reference numerals refer to like elements, the invention is described hereinafter in the context of suitable networking and computing environments. FIG. 1a illustrates a conference system including a plurality of attendee computers 20A, 20B and 20C in communication over a network 100 for conducting a video conference in accordance with teachings of the invention. Each of the attendee computers 20A–20C is the site of a respective conference attendee A–C. It should be understood that the network 100 can include the Internet, another type of WAN, or one or more LAN. At least one of the attendee computers 20A–20C is equipped with a video camera 42 and a microphone 43 to transmit audio and video data over the network 100. It will further be understood that the conference can be conducted among any number of attendee computers, two or more, depending on available bandwidth and other resources. Additionally, it should be understood that an attendee computer without a camera and/or microphone could join the conference as a passive listener.

In the exemplary embodiment of FIG. 1a, the conference system includes a host or conference server, referred to herein as a Multipoint Conferencing Unit (MCU) 120. The MCU 120 communicates with the attendee computers 20A–20C over the network 100 handles routing of conference video among the various attendees. The MCU 120 acts as an intermediary, distributing streams generated by each of the attendee computers 20A–20C over the network 100 to the other attendees that are to receive them. The MCU can perform tasks such as negotiating communication-modes to the attendees and/or the recording unit, determining which attendees will receive which other attendees outputs, etc.

The system illustrated in FIG. 1a additionally includes a recording unit 600 (hereinafter "RU") which receives data from MCU 100 over a connection 152, which may be a LAN, as described below in connection with FIG. 4. Optionally, the RU 600 is connected to the MCU 120 via a network link 154 over the same network 100 in a manner similar to the attendee computers. The MCU 120 and RU 600 can be operated as a part of a conference service indicated by a dashed box 130.

Figure 1B:
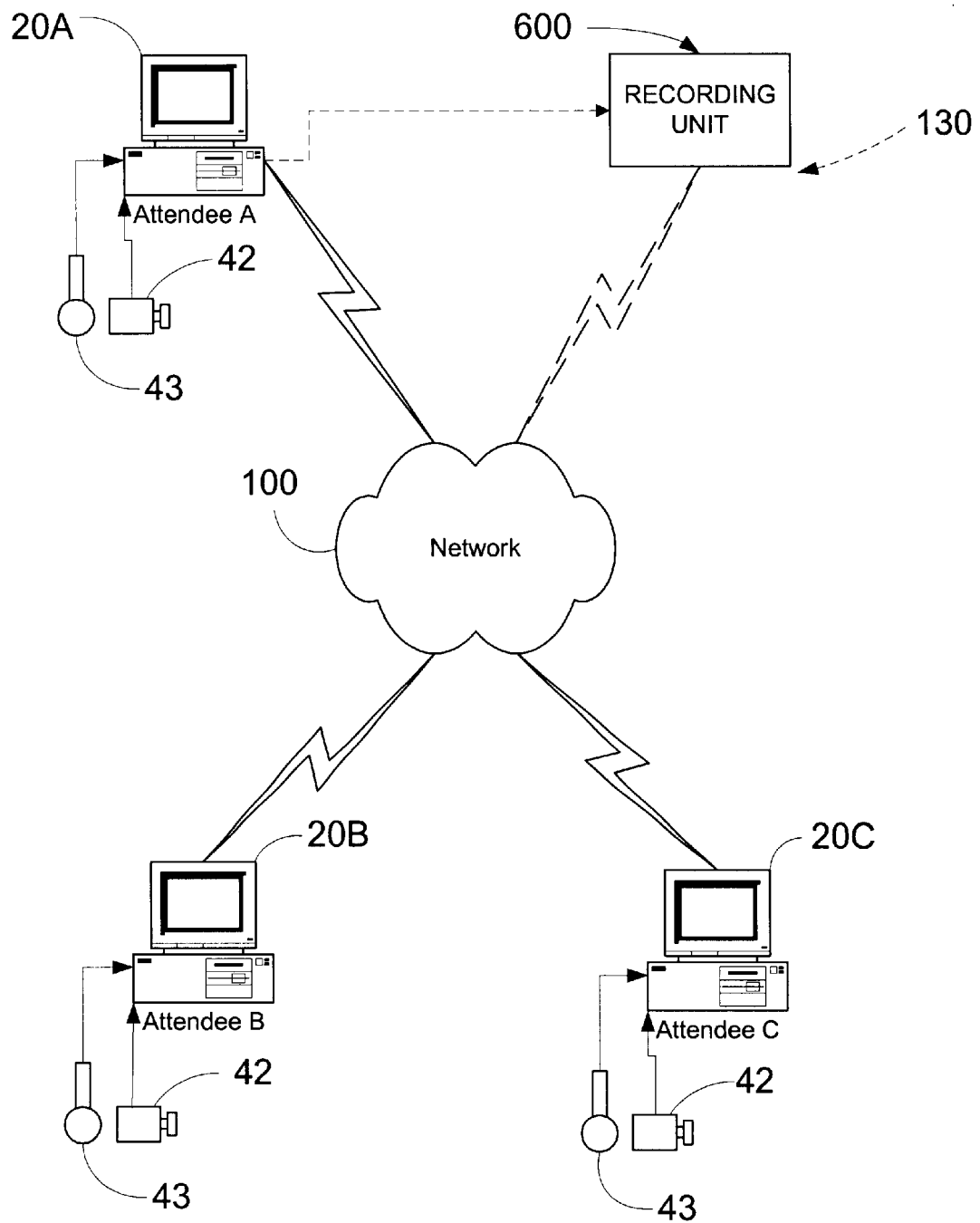
FIG. 1b is a schematic diagram illustrating an alternative peer-to-peer system wherein the attendee computers transmit conference communications directly to each other, and wherein the recording unit joins the conference as an additional peer device.

For operating the RU 600 in a peer-to-peer conference environment, an alternative embodiment is illustrated in FIG. 1b, wherein the attendee computers 20A–20C communicate over the network 100 in a peer-to-peer manner, wherein each attendee is multicasting to the others without the direction of an MCU. The RU 600 is implemented as an additional peer device to record the conference, the RU receiving data streams from any one or more of the attendees.

The RU 600 records the conference according to a process which will be described in greater detail below in connection with FIGS. 3a–3c.

Referring back to FIG. 1a, each conference attendee communicates only with the MCU in a unicast manner. The MCU then distributes outgoing streams to all the attendees in a multicast or multiple-unicast manner. The conference video can be distributed among the attendee computers 20A–20C according to a variety of schemes depending on the needs of the attendees and available bandwidth. In an embodiment, each of the attendees receives the same, single video image. For example, attendees B and C would receive attendee A's output. The image may be selected by a designated meeting moderator who can switch the image sent to all attendees during the conference. In an embodiment, attendee A may receive the output of one or more of the other attendees. In another embodiment, multiple streaming video images may be sent to some or all of the attendees, however, the ability to handle such a display may be limited by bandwidth and client end processing power to handle any necessary decoding and mixing tasks. Whether the MCU 120 distributes one or more video stream as part of the conference, the MCU 120 also forwards each conference video stream to the RU 600.

Although it is not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types.

The invention may be implemented in computer system configurations other than a PC. For example, the invention may be realized in hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices. Although the invention may be incorporated into many types of computing environments as suggested above, the following detailed description of the invention is set forth in the context of an exemplary general-purpose computing device in the form of a conventional PC 20.

Before describing the invention in detail, the computing environment in which the invention operates is described in connection with FIG. 2.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through input devices such as a keyboard 40 and a pointing device 41. In an embodiment wherein the PC 20 participates in a multimedia conference as one of the attendee computers 20A–20C (FIGS. 1a, 1b), the PC also receives input from a video camera 42 and microphone 43. Other input devices (not shown) may include a joystick, game pad, satellite dish, scanner, or the like. These and other input devices are often connected to the processing unit 21 through a serial port interface 44 that is coupled to the system bus 23, but may be connected by other interfaces, such as a parallel port, game port or a universal serial bus (USB). A monitor 45 or other type of display device is also connected to the system bus 23 via an interface, such as a video adapter 46. In addition to the monitor, the PC includes a speaker 47 connected to the system bus 23 via an interface, such as an audio adapter 48. The PC may further include other peripheral output devices (not shown) such as a printer.

Figure 2:
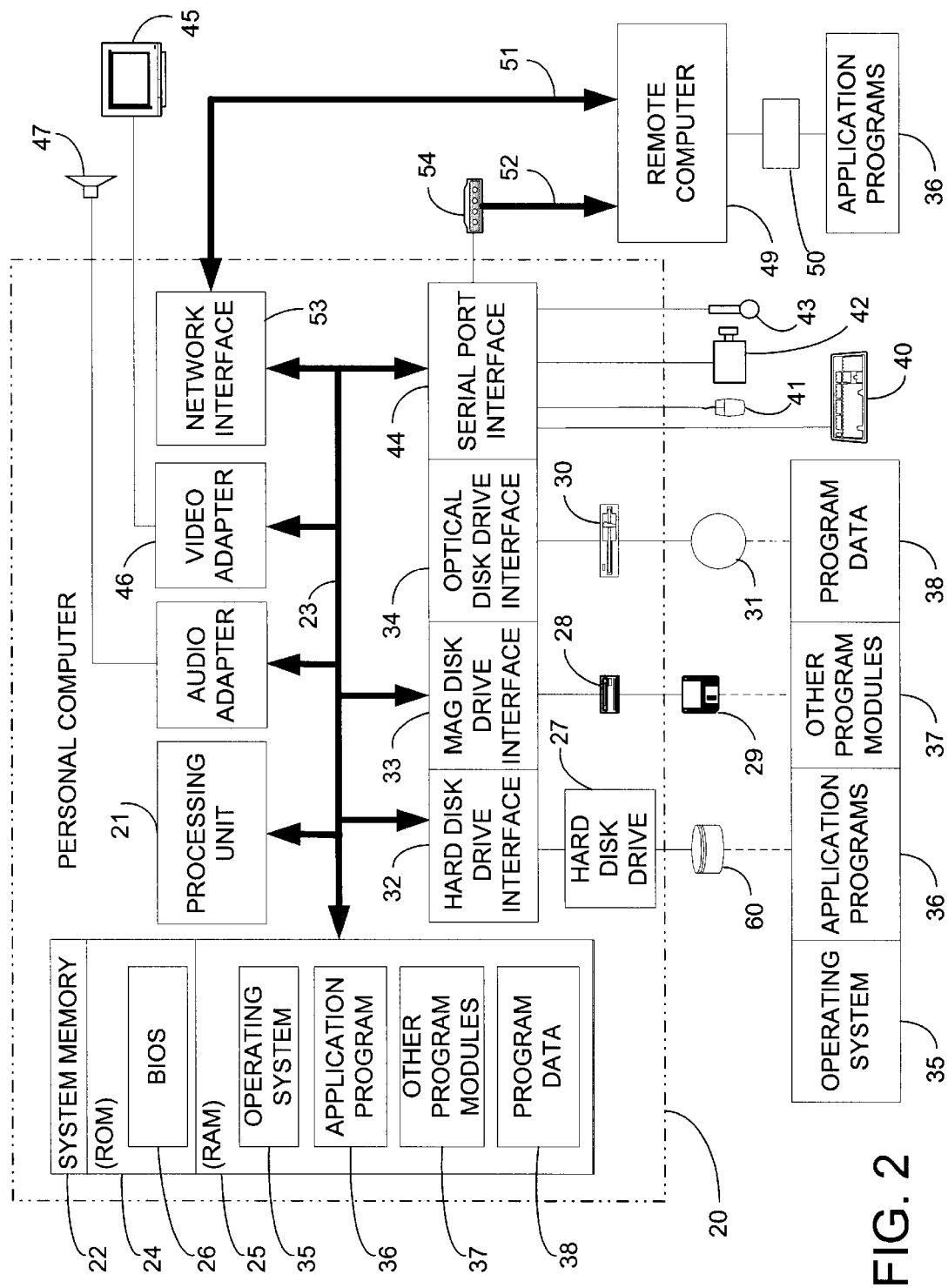
FIG. 2 is a block diagram generally illustrating an exemplary computer system on which the present invention can be implemented.

The PC 20 of FIG. 2 may operate in the network environment using logical connections to one or more remote computers, such as a remote computer 49 which may represent another PC, for example, one of the attendee computers 20A–20C, a conference server such as the MCU 120 of FIG. 1a, a LAN server, the RU 600, a router. The remote computer 49 typically includes many or all of the elements described above relative to the PC 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 44. In a networked environment, program modules depicted relative to the PC 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Turning back to FIGS. 1a and 1b, each of the client or attendee computers 20A–20C has software capable of processing, playing and generating multimedia audio and video. The software can be adapted for implementation with a variety of appropriate multimedia encoding formats, as are generally known. Additionally, in the embodiment of FIG. 1a wherein a server such as the MCU 120 directs the communications among the attendee computers 20A–20C, the MCU 120 is loaded with software which enables the appropriate routing functionality. The software can be downloaded to the computers prior to the conference or provided on some recorded medium, such as an optically readable disc, a magnetically readable disc or tape, or some other known medium.

In accordance with an aspect of the invention, a method of recording is provided which implements an initial storage step and a subsequent "post-conference process." During the initial storage step, the audio and video streams are directed to a recording unit at which the data is stored in raw, compressed wire format. Subsequently, the data is transcribed into a standard format and re-stored during a post-conference process which is performed after the meeting and before the playback. The post-conference process generates a standard format recording of a conference without use of the server processing resources, thereby freeing up the server resources for tasks associated with administering conference communication flow.

According to a further aspect of the invention, the RU includes one or more computers which perform tasks associated with storing the data during the conference and performing the post-conference processing, including transcribing the data and ultimately providing a readable recording of the meeting. In an embodiment, the RU could be a single computer, such as the PC 20 of FIG. 2, or a set of networked computers, as will be described in greater detail below in connection with FIG. 4.

Referring again to FIG. 1a, the MCU 120 is a data-conferencing server through which all attendees' data is routed. The RU 600 joins the conference by the MCU 120, and much like an attendee 20A–20C, receives all the meeting's data. The RU 600 performs all of the storage and subsequent processing tasks associated with recording.

From perspective of the attendees 20A–20C, the RU does not need to appear as though it represents a human user. The RU can be omitted from a "roster" displayed by the user interface of the attendees, or the RU could be indicated in the roster as a non-human computer joined to the conference.

In an exemplary environment, a meeting coordinator contacts the conference service 130 which controls the MCU 120 to set up conference arrangements. When the meeting is scheduled, an MCU 120 is reserved, and a procedure for joining the meeting is selected. The potential attendees are identified to the MCU and sent a message inviting them to participate in the conference. In an embodiment, the message is sent by an instant messaging system or email, and the message can contain log on information to be input by the attendee 20A–20C, such as a conference web address and the conference designation. At the designated meeting time, either the MCU 120 or the attendees will initiate communications. Optionally, authorized attendees can contact the MCU to join in after a secure log on procedure. The attendees are preferably provided beforehand with a password. As will be recognized by those skilled in the art, a gatekeeper can be implemented to grant access over the network to the conference the basis of whatever criteria the administrator has imposed and/or to perform address translation tasks.

When meeting coordinator has designated a scheduled conference to be "recorded," the conference service 130 further allocates a recording unit, such as RU 600, as a resource. This allocation is preferably made prior to the actual time of the meeting. Recording automatically begins and ends with the meeting, as controlled by the MCU. In an embodiment, the conference coordinator may submit an advance request to generate a copy of a recording of the meeting on a CD-ROM to be delivered afterward, as will be explained in greater detail below.

Now with reference to FIGS. 3a–3c, an exemplary process will be described according to an embodiment of the invention for conducting and recording an online conference. FIGS. 3a–3c is a flow chart with steps executed by the MCU 120 shown vertically along the left, and steps executed by the RU 600 shown vertically along the right. The vertical positions on the flow chart advance downwardly with time. Although the steps are indicated in a dual-column format for ease of illustration, it should be understood, however, that the separate steps of FIG. 3a could all be performed by the same computer, or various steps could be respectively performed by a various different computers. For example, in an embodiment, the MCU 120 and the recording unit 600 of FIG. 1a can be the same computer.

In general, steps 310, 320 and 330 of the process of FIG. 3a may be administered generally in accordance with conventional conferencing methods and systems. For example, the conference can be initiated, conducted and terminated according to a standard conferencing protocol, such as T.120, which is generally known in the art. Notably, proprietary protocols may be used, for example proprietary protocols by Picturetel, or Compression Labs. An advantage of the post-conference process described herein is that a proprietary format can be used for secure transmission, yet the recording can be transcribed and preserved as a copy in a standard format for convenient playback.

At a beginning of a scheduled meeting, a connection is established over the network between the MCU 120 and the RU 600, at step 300 as shown in FIG. 3a. The RU is available to begin recording the streams from the outset of attendee communications. At this point, with reference to FIG. 1a, for example, the RU 600 waits to receive a feed of conference data streams from the MCU 120.

At step 310, a connection is also established between the MCU 120 and the attendee computers. For example, at a prearranged time, the MCU 120 will establish a connection by accepting a logging on of invited or authorized attendee computers 20A–20C. The MCU preferably operates on a conferencing protocol which permits new attendees to join a conference in progress.

At step 320 of the process of FIG. 3a, the MCU 120 creates the conference by routing the data streams among the attendees. Each of the attendee computers is capable of generating an audio stream and a video stream based on input from the respective camera 42 and microphone 43. The streams are packetized and compressed according to the particular wire format being used for transmission over the network 100. The MCU receives the streams from all or selected attendee computers, and the MCU forwards selected streams to each of the attendees. For example, in an embodiment, the MCU sends a video stream from one of the attendees to all of the attendees, while the MCU directs all of the audio streams to all of the attendees. In an embodiment, the MCU could also be programmed to send only selected audio streams.

The MCU 120 additionally directs the conference streams to the RU 600 at step 320, which has been join with the meeting at step 300. The streams sent to the RU contain packets of raw data in the same compressed format transmitted to the attendees. The data routed to the RU in step 320 includes all of the streams which are to be implemented into a playable recording. In an embodiment wherein the MCU routes a uniform presentation to all of the attendees, the same presentation may be routed to the RU, which typically includes all of the audio, one selected video stream, and optionally an application data stream, such as a document or electronic drawing. However, in an embodiment, the MCU sends all of the streams generated by the attendees to the RU, regardless of whether attendees view only selected streams.

At step 325 of the process FIG. 3, the RU initially stores of the conference data. In particular, during the conference, the RU merely "listens" and blindly records all conference data. Step 325 is intended to preserve the conference data in a quick and efficient manner for later use to generate a playable recording. According to an aspect of the present invention, the RU initially stores the raw data in the same wire format used for the network transmission, avoiding audio mixing or transcribing prior to storage.

Figure 3B:
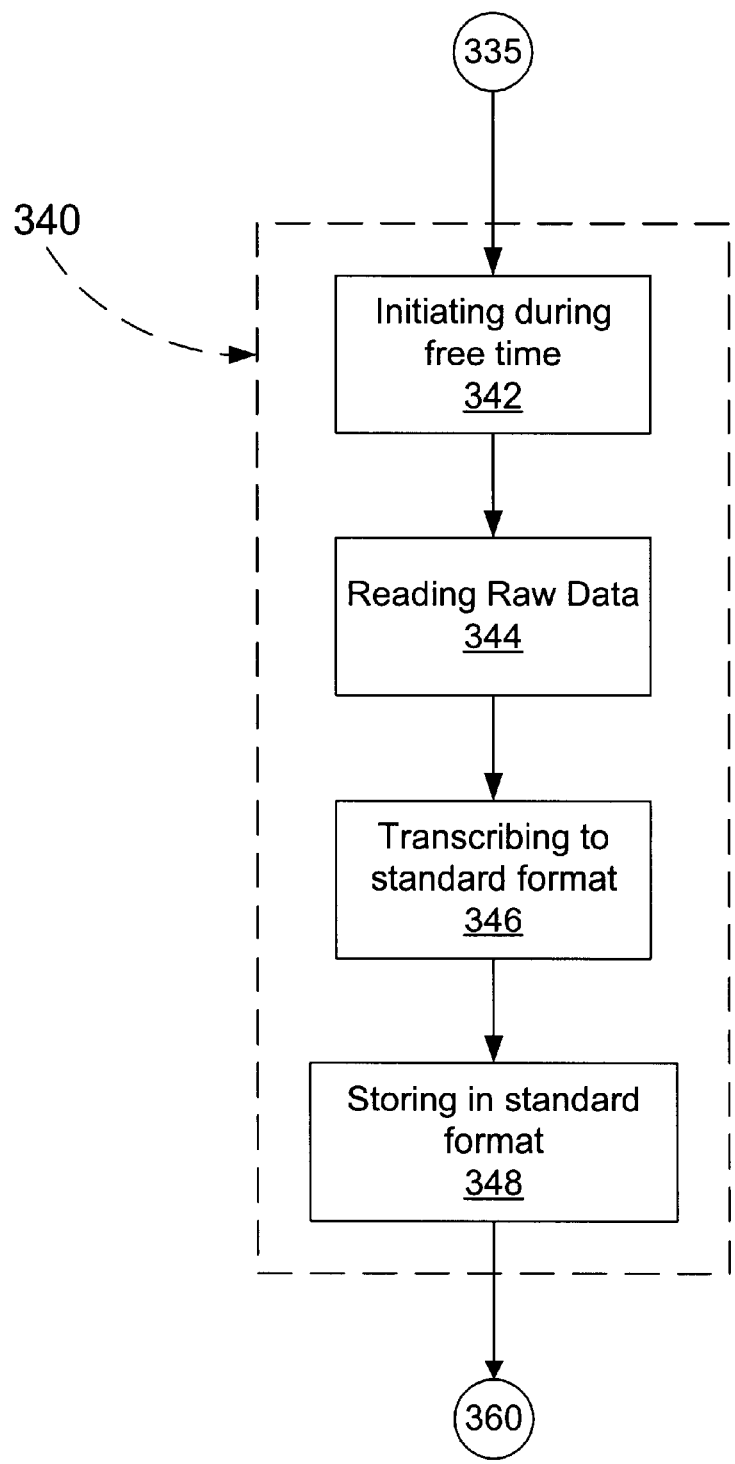
Figure 3C:
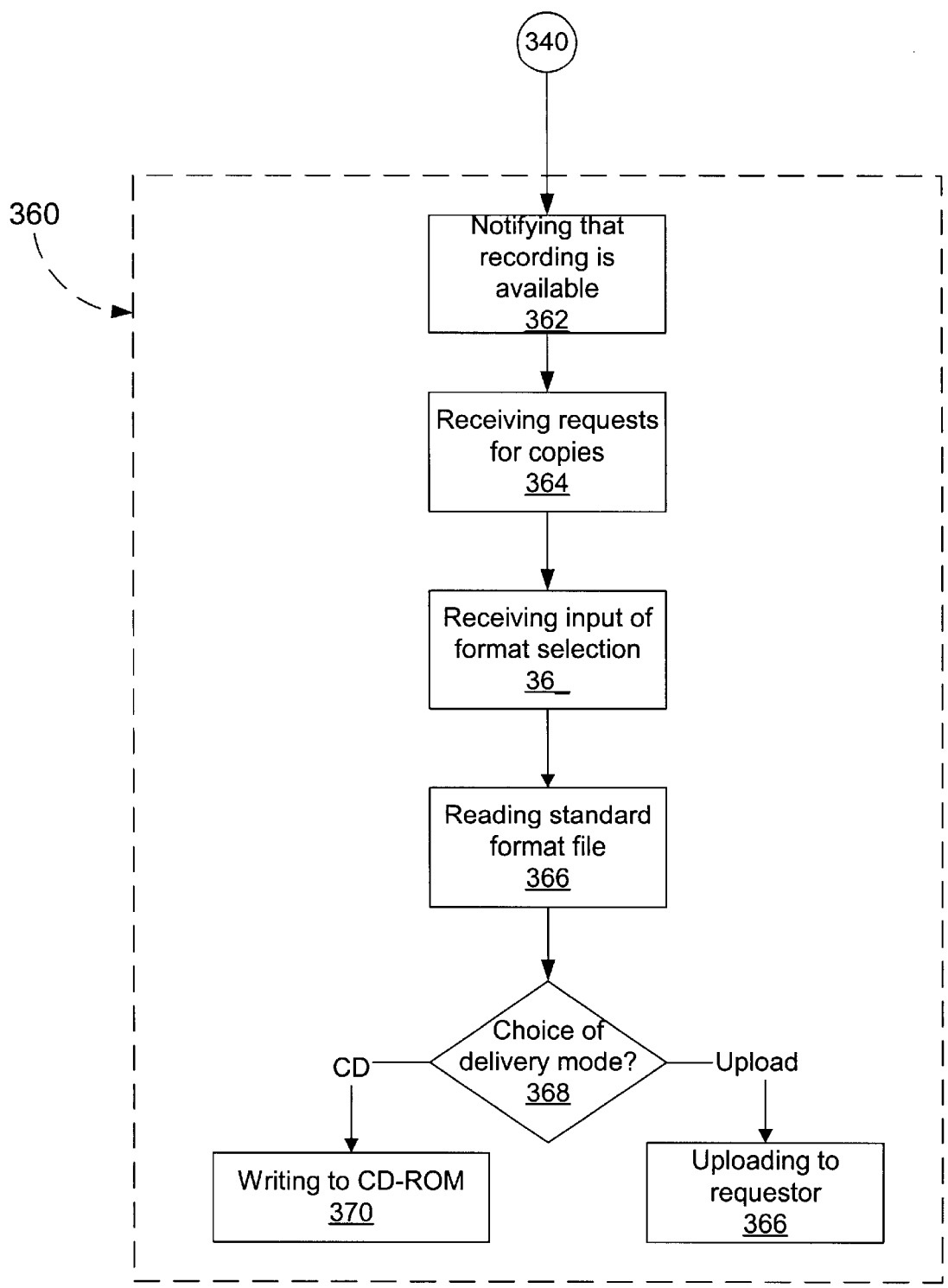
FIG. 3c is a flow chart illustrating in expanded form a step of the process of FIG. 3a during which the transcribed recording is provided to authorized recipients.

The process of FIGS. 3a–3c will further be described in conjunction with occasional reference to FIG. 4, which schematically illustrates exemplary functional components comprising an RU 600. It will be understood that process of FIGS. 3a–3c and the architecture of FIG. 4 are applicable not only to the client-server architecture as illustrated in FIG. 1a, but also to the peer architecture FIG. 1b, except in the latter case one of the attendee computers would additionally perform the functions of the MCU. Moreover, although FIG. 4 illustrates numerous separate hardware devices in association with various respective functions performed by the RU 600, it should be understood that all, or any combination of, the recording, transcribing, and copying tasks could be handled by a single computer or by multiple computers and components. Generally, FIG. 4, illustrates the RU 600 connected over a MCU LAN 125 to the MCU. The RU 600 comprises various components including an initial storage unit 605 with a disk array 610 or some other appropriate storage device, a resource management computer (RMC) 615, a transcribing computer 620, a mail server 625, a copy generation unit 630 having a recording storage unit 635 and a CD-ROM write drive or "CD Burner" 640. Additionally, the embodiment of FIG. 4 includes a back end LAN 645 over which all the computers 605, 615, 620, 630 are in communication. Arrows 4A–4E indicate an exemplary communication and data flow among the aforementioned components of the RU 600.

Referring to FIG. 4, when the raw conference data is sent to the RU 600 (step 325 of FIG. 3a) the data flows as indicated by arrow 4A to the initial storage unit 605 which merely receives and writes the compressed conference data streams to a storage device, such as disk array 610, throughout the conference. By storing the data in unprocessed form, the RU 600 enables all transcription of data into a playable recording to be postponed until after the conference has ended.

In the process of FIG. 3a, the conference ends at step 330. The MCU can terminate the conference when the attendees have signed off, upon a signal by an authorized attendee or a meeting moderator, or automatically at a predetermined time. The MCU ceases to stream conference data to the RU when the conference ends at step 330. This begins a waiting step 335. As shown in FIG. 4, during the waiting step (335) the storage unit 610 of the RU 600 holds the initially-stored, raw conference data in the form of intermediate binary audio and video files. The waiting step 335 can be any period of time until a transcribing of the data is to occur during the "post-conference processing" step 340.

According to an aspect of the invention, the RU postpones processing the stored data into a playable format until the "post-conference processing" step 340 after the conference has ended. Generally, the post-conference processing step 340 is a transcription session for tasks associated with converting the stored wire-format conference data into a playable, standard format recording. For example, the post-conference processing step 340 may involve decompressing, audio mixing, and reencoding data. By postponing processing-intensive tasks until after the conference, the MCU processing resources can advantageously be dedicated to administrative tasks such as conference stream routing. Another advantage is that the decode/re-encode process no longer has to be done in real-time.

Turning to FIG. 3b, the post-conference processing step 340 is illustrated in greater exemplary detail. In order to efficiently utilize computer processing resources, the post-conference process 340 of FIG. 3b is initiated at step 342 based on one or more parameters selected to avoid using processing resources needed for other tasks considered to be more time-critical. One of the parameters may be the scheduled time a conference. For example, the initiating step 342 occurs at a time when no conferences, or a minimal number of conferences, are being,conducted such as during gaps between scheduled conferences or at a preset time during which the conference service is typically least busy, e.g., 3 a.m. Another parameter may be the actual duration of a conference, for example, wherein the post-conference process is initiated immediately after the conference has ended, after all attendees have signed off.

Optionally, an algorithm balances a plurality of parameters to determine an appropriate time to initiate the post-conference processing jobs from one or more stored conferences. In addition to the above conference schedule and duration parameters, another such parameter is the remaining capacity of the RU storage unit, to initiate transcribing if the storage unit is reaching a full condition. An further parameter includes the level of CPU usage of machines which can perform the transcribing tasks, e.g., the RU itself or separate transcribing computers.

In any case, when the post conference processing is initated, the RU sends the initially stored data to an appropriate address for transcription. The RMC 615 of the RU 600 illustrated in FIG. 4 can initiate the post conference processing based on the initiation algorithm criteria.

After the initiation step 342, still referring to FIG. 3b, the initially stored raw data is read at step 344 for transcribing. For example, in the embodiment of FIG. 4, the RMC 615 sends an initiation signal 4B, thereby causing the initially stored data to be sent from the disc array 610 to the transcribing computer 620, as indicated by arrow 4C.

A transcribing step 346 occurs upon the reading of the initially stored raw data, as shown in the flow chart of FIG. 3b. The transcribing step 346 includes any appropriate data processing needed to convert from the raw wire format in which the data was initially stored to a readily readable standard format file. Accordingly, the transcribing step can vary depending upon the wire and standard formats used. For exemplary purposes, the transcribing step will be generally described in an exemplary embodiment wherein the wire format is WMA and WMV, and wherein ASF is the standard format for the end recording. Those skilled in the art will recognize that other formats could be used as well.

In an embodiment, the RU transcribes the raw data into multiple recording formats and/or quality levels to accommodate the needs of the end users. For example, the separate recording files can be transcribed for MPEG, Quicktime, and ASF and separately stored. Furthermore, the RU can transcribe the recording to create multiple files having various quality levels (e.g., pixel resolution, frame rate, sound bit rate, etc.) to accommodate specific user bandwidth capacities.

After the data is transcribed at step 346, the resulting standard format data is stored as an archive file at step 348, as shown in the chart of FIG. 3b. Referring to FIG. 4, for example, the transcribing computer 620 streams directs the standard format data to another data storage unit 635, as indicated by arrow 4D. Once the transcribing step has been completed, the original raw data files can be deleted from the initial storage device. In an embodiment wherein the data can be transcribed in a single-pass, linear fashion, the raw data file is reduced as the data is transcribed.

Step 360 follows the completion of the post-conference processing step 340 in order to provide the recorded conference for later viewing, as shown in FIG. 3a. An example of this providing step 360 is illustrated in FIG. 3c in greater detail.

At step 362 of FIG. 3c, a notice may be sent to inform selected persons that a recording of the conference is available for viewing. For example, with reference to FIG. 4, as indicated by arrow 4F, the RMC 615 can instruct a mail server 625 to send an email the original coordinator of the meeting, the invited attendees, and/or any authorized person or group who might be interested in the content of the conference. Alternatively, the RMC 615 could instruct a network server (not shown) to post the notice on a website, such as a website associated with the conference service 130 (FIG. 1).

At step 362 of FIG. 3c, the RU receives requests for copies of the transcribed recording. Requests or orders for copies of the recording may be received in various ways, such as by email, input to the RMC 615 (FIG. 4) over a website, or by telephone. A request could be made at any time, even prior to the conference. The requests may be handled manually. Furthermore, where the recording optionally has been transcribed into different types of standard format files, a requestor is prompted to input a desired recording format at step 365.

In an embodiment, the providing step 360 includes generating of a copy of the recording. A copy may be generated in a per-request basis and/or in an automated fashion based upon predetermined and/or selected criteria. Alternatively, a copy of the recording may be automatically sent to selected recipients. The exemplary providing step 360 of FIG. 3c includes a per-request generation, wherein the standard format file read at step 366 when the request is entered at step 364. The copy may be provided in various ways, and in an embodiment, the requester may be presented with a choice of delivery mode, as indicated in step 368. For example, the copy may be generated by writing the transcribed, standard format recording on a CD-ROM at step 370. Alternatively, the standard format file can be electronically uploaded over the network to a recipient client as indicated in step 366.

Step 370 could be executed by the copy generation unit 630, shown in FIG. 4, which retrieves the transcribed, standard format file from the storage unit 635 and, as shown by arrow 4E, writes one or more copies of the file on a CD-ROM at the associated CD burner 640. Of course, those of skill in the art will recognize that the recording could be copied onto any other digital recording medium. Alternatively, if a requesting party chooses at step 368 to receive an electronically delivered copy of the conference, the archived recording is uploaded at step 366 to the requester.

Now the transcribing step 346 of the post-conference process 340 (FIG. 3b) will be explained in greater detail. Those skilled in the art will understand that the transcribing tasks are generally known, however, the post-conference process enables the indefinite postponement of transcribing until after the conference has ended, yet prior to delivery of the recording. Advantageously, the execution of transcribing tasks is not limited by the real-time restrictions of the meeting. The lack of time constraints permits the use of a less powerful computer for the transcribing tasks, advantageously reducing costs. Furthermore, because transcribing operations do not scale as well as storing raw conference data, in an embodiment, several meeting transcription tasks can be serialized on one transcribing computer server, completing them one after another.

Those skilled in the art will understand that each audio and video stream in a meeting are sent to the RU on a different "channel." A function of the RU during the meeting is to detect any notification of a new audio stream, and when such a new stream presents itself, to subscribe to that data channel. Then, each data packet that arrives on that channel needs to be written out to a separate file. Additionally, if a user broadcasts audio, then stops for a while, then broadcasts again, these two discontinuous audio tracks will be written to two separate files.

In a known manner, the raw data streams contain a series of packetized data units (PDUs). An exemplary stream of PDUs is illustrated in FIG. 5, which depicts respective audio and video streams generated by each of the attendees 20A–20C and sent to the MCU 120 on respective channels. In particular, FIG. 5 illustrates an audio stream 500 on a data channel from attendee A which contains a series of audio packets $PDU_{A1}$, $PDU_{A2}$, $PDU_{A3}$ through $PDU_{AN}$. Each of these exemplary PDUs is shown having a length of approximately 66 ms, although any appropriate packet size could be used.

The $PDU_{A1}$ is shown in expanded form below the stream. Each of the PDUs has certain header information including appropriate protocol header information. For example, in the exemplary embodiment of FIG. 5, header information is provided corresponding to Internet Protocol (IP), Transmission Control Protocol (TCP), and T.120 multipoint conferencing protocol. It will be understood that each of the audio and video streams corresponding to each of the respective attendees 20A–20C comprises packets similar to those of the raw data stream 500, and that the streams forwarded by the MCU 120 to the RU includes any or all of the raw audio and/or video streams. In one embodiment, for example, the MCU 120 forwards all of the audio streams to the RU, but only a selected "presenter" video stream during the conference.

In order to achieve a synchronized recording, the various multimedia streams must be interpreted and transcribed according to the sequence in time that the PDU was created by the respective sending attendee. Accordingly, each of the PDUs further includes a timestamp and roster identification information corresponding to the particular attendee who sent the PDU. Optionally, a "friendly" user name (e.g., "Prof. Smith" or "San Diego Office") associated with the particular attendee is additionally included in the header (not shown). A friendly name corresponding with the particular roster information could alternatively be provided in a preset lookup table. The binary audio data 540 follows the header information in the PDU.

When an audio PDU arrives at the RU, a timestamp 520 has been generated by the sending attendee's computer relative to a beginning of the audio stream on the associated channel. For example, Table 1 below shows exemplary timestamps of attendees A and B as determined by the clock when those particular packets were created.

TABLE 1

| Attendee A Timestamp | Attendee B Timestamp |
|---|---|
| 2000 | 3500 |
| 2001 | 3501 |
| 2002 | 3503 |
| 2006 | 3505 |
| 2007 | 3507 |

In an embodiment, the RU stores the packets exactly as received, containing the attendee timestamp information. As described below, the RU uses the timestamps to enable resynchronization of the data even though the individual clocks, and created timestamps, are usually not synchronized among attendee computers. In Table 1, the initial timestamp according to attendee A's computer was 2000 ms upon generating the first packet and the initial timestamp according to attendee B's computer was 3500 ms. The subsequent packets were generated at slightly inconsistent intervals between the attendees A and B.

The transcription process includes opening all stored audio files of raw data. However, to compensate for inconsistent computer clockspeeds and network flow inconsistencies which can cause packets from various attendees to arrive at different rates, the RU converts each attendee timestamp to a master timestamp measured relative to a master clock at the transcribing computer of the RU. The post-conference process includes applying a master timestamp which is used to maintain consistency among the streams from the various attendees in the transcribed recording. For example, in an embodiment, the master clock starts a counter at an initial value, such as 0, starting at the arrival time of a first packet to the RU. The counter advances in increments, such as by milliseconds. In an embodiment, to convert the timestamp in the received packets relative to the master clock counter, an algorithm alters the timestamp value of each packet received on a respective channel by subtracting the initial attendee timestamp value (e.g. 2000 for attendee A, 3500 for attendee B) from the first, and each subsequent packet. Table 2 below illustrates the resulting timestamps relative to the RU master clock, the underlying mathematical calculation indicated in brackets.

TABLE 2

| RU Timestamp for Audio A | RU Timestamp for Audio B |
|---|---|
| 0 = [2000–2000] | 0 = [3500–3500] |
| 1 = [2001–2000] | 1 = [3501–3500] |
| 2 = [2002–2000] | |
| | 3 = [3503–3500] |
| | 5 = [3505–3500] |
| 6 = [2006–2000] | |
| 7 = [2007–2000] | 7 = [3507–3500] |

The timestamp conversion is performed for each packet received over each channel through all of the meeting data. If a new attendee joins after the meeting has started, master clock value at the starting packet is used as the initial value. In an alternative embodiment, the timestamp conversion may be implemented prior to the initial storage, because the mathematical process consumes little processing power.

According to the synchronized timestamps, the opened audio data can be reassembled sequentially and synchronously.

The files are then decompressed according to an appropriate codec algorithm and mixed as a single audio track. The video stream is also read and written with the mixed audio track as a multimedia recording according to the particular standard format to be implemented. For example, where the compressed wire format audio and video are in WMA and WMV formats, respectively, the recording file is reencoded according to ASF file format.

According to some formats, it is not required to decompress and recompress the raw video data in order to compile the video with the audio as a standard format multimedia file. For example, writing the video track into ASF includes copying over the compressed video packets with the appropriate timestamps, avoiding a need to decompress the video stream. This advantageously avoids quality losses generally associated with each decompression and compression cycle of encoded data. The transcription could include further video processing depending on the selected end format.

It is noted that most audio mixing processes first require the audio streams to be decompressed. Accordingly, in order to minimize audio quality loss from subsequent recompression, the post-conference process operates to mix the audio as a WAV file at a bit rate that is relatively higher than it the initially stored audio. In particular, even though the raw conference audio streams likely have a low bit rate, e.g. 10 kbps, in an embodiment, the RU recompresses the mixed audio using a relatively higher bit rate, e.g. 256 kbps, as is used for standard CD-ROM quality. This practice maintains the original quality of the audio without significant further losses. Moreover, because the audio track of the transcribed standard format file does not have to be distributed over the network in real-time, the relatively higher bit rate is practical as well. A pulse code modulation buffering can be implemented for mixing at the higher bit rate. Advantageously, the resulting recording has a smooth quality which is in many cases better than the live conference as viewed by the attendees.

Finally, the video stream is combined with the audio track to produce a standard format multimedia file containing the playable recording, as is generally known. In an embodiment, only one video image is recorded at a given time in a meeting, although the image may be switched among cameras, but audio from all attendees is recorded during the meeting. This video and audio is then encoded into an ASF file, written to storage. Playback of the ASF recording can be done using Windows Media Player since the audio/video is in a standard format. Optionally, multiple video streams are depcompressed and placed into a larger grid, resulting a single video stream having a grid of video images.

Although the post conferencing process advantageously enables the transcription to be performed on an inexpensive computer having low processing capacity, the post-conference process could also yield benefits when performed at an RU which has substantial processing capacity and memory resources. For example, for a high-traffic commercial conferencing system, an embodiment of the RU server is capable of recording two thousand simultaneous one-way sessions without server performance degradation, e.g. 2000×100 kbps=200 mbps. An exemplary RU server having such performance could include dual Pentium-III 733 mhz CPUs with 4 GB of random access memory (RAM). Additionally, the RU could be equipped with a 200 mbps fiber channel hard disk controller and several dozen GB of hard disk space for temporary recording storage.

The post-conference process greatly enhances the scalability of both recording and conferencing tasks. First, the post-conference process permits the conference recording to easily scale to the number of attendees in a meeting. Second, the post-conference process permits the conference recording to scale to many simultaneous meeting. Currently, the primary limitation is transmission bandwidth to the RU and by the speed of the storage hardware used for storing the initial raw data files. Use of the post-conference process renders the MCU more scaleable to simultaneously handle more conferences and conference attendees.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of recording a network conference comprising:
   distributing raw conference data among a plurality of attendee computers, the raw conference data including multiple simultaneous streams of compressed audio or video data; and
   routing selected raw conference data to a recording unit, wherein the recording unit performs steps comprising:
      initially storing the raw conference data;
      converting timestamps of at least some of the raw conference data into master timestamps; and
      transcribing at least some of the raw conference data into a playable, standard format recording, wherein the transcribing comprises using the master timestamps to synchronize the at least some of the raw conference data.

2. The method of claim 1, wherein the converting and transcribing are initiated after the conference has ended.

3. The method of claim 2, wherein the initiating occurs based on one or more parameters including a time of minimal conference activity.

4. The method of claim 2, wherein the initiating occurs based on one or more parameters including the capacity of the storage unit.

5. The method of claim 2, wherein the initiating occurs based on one or more parameters including a level of CPU usage of one or more transcribing computers.

6. The method of claim 1, wherein the recording unit further performs steps comprising: storing the data in said standard format.

7. The method of claim 1, wherein the transcribing step further comprises:
   decompressing audio data in the at least some of the raw conference data, mixing the audio data, and encoding the mixed audio into the standard format.

8. The method of claim 7, wherein the encoding the mixed audio includes encoding the mixed audio at a higher bit rate than a bit rate of the raw conference data.

9. The method of claim 7, wherein the encoding the mixed audio includes encoding the mixed audio data with video data according to the standard format.

10. The method of claim 1, wherein the recording unit further performs steps comprising deleting the initially stored raw conference data after the transcribing step has been completed.

11. The method of claim 1, wherein the recording unit further performs steps comprising writing the standard format recording on a CD-ROM.

12. The method of claim 1, wherein the recording unit further performs steps comprising notifying at least one party of the recording availability after the transcribing step.

13. The method of claim 12, wherein the notifying includes sending an email to the at least one party.

14. The method of claim 12, wherein the notifying includes posting information on a website.

15. A method of recording a network video conference comprising:
   connecting to a recording unit hosting a conference to receive conference data including multiple simultaneous audio and video streams in wire format;
   initially storing the multiple simultaneous audio and video streams in the wire format at the recording unit; and
   performing a post-conference process after the conference has ended, the post-conference process including:

converting timestamps of at least some of the wire format conference data into master timestamps;

transcribing the at least some of the wire format conference data to a playable, standard format recording, wherein the transcribing comprises using the master timestamps to synchronize the at least some of the wire format conference data;

storing the standard format recording; and providing the standard format recording.

16. The method of claim 15, wherein the providing step includes writing the standard format recording to a CD-ROM.

17. The method of claim 15, wherein the providing step includes reading the stored standard format recording and uploading the standard format recording to a requesting client.

18. The method of claim 15, wherein the post-conference process is initiated during a period of minimal conference activity.

19. The method of claim 15, wherein the post-conference process is initiated when a transcribing computer is available.

20. The method of claim 15, wherein the step of initially storing the multiple simultaneous audio and video streams in the wire format includes writing each audio and video stream as a separate file.

21. The method of claim 15, wherein the transcribing further comprises:

decompressing at least some of the initially stored multiple simultaneous audio streams, mixing the decompressed audio streams, and encoding the mixed audio at a higher bit rate than a bit rate of the initially stored audio.

22. The method of claim 21, wherein the step of transcribing further comprises:

encoding the mixed audio with video data according to said standard format.

23. The method of claim 15, further comprising the step of notifying after the standard format recording has been stored.

24. The method of claim 23, wherein the notifying step includes sending at least one email.

25. A computer-readable medium having computer-executable instructions for performing a recording process at a recording unit to record a network conference, the recording process comprising:

connecting to the recording unit hosting a conference server to receive conference data including multiple simultaneous audio and video streams in wire format;

initially storing the multiple simultaneous audio and video streams in the wire format at the recording unit;

performing a post-conference process after the conference has ended, the post-conference process including:

converting timestamps of at least some of the wire format conference data into master timestamps;

transcribing the at least some of the wire format conference data to a playable, standard format recording, wherein the transcribing comprises using the master timestamps to synchronize the at least some of the wire format conference data;

storing the standard format recording; and providing the standard format recording.

26. The computer-readable medium of claim 25, wherein the providing step includes writing the standard format recording to a CD-ROM.

27. The computer-readable medium of claim 25, wherein the providing step includes reading the stored standard format recording and uploading the standard format recording to a requesting client.

28. The computer-readable medium of claim 25, wherein the post-conference process is initiated during a period of minimal conference activity.

29. The computer-readable medium of claim 25, wherein the post-conference process is initiated based on one or more parameters including conference schedules.

30. The computer-readable medium of claim 25, wherein the post-conference process is initiated based on one or more parameters including the capacity of the storage unit.

31. The computer-readable medium of claim 25, wherein the post-conference process is initiated based on one or more parameters including a level of CPU usage of one or more computers configured to perform the transcribing.

32. The computer-readable medium of claim 25, wherein the step of initially storing the multiple simultaneous audio and video streams in the wire format includes writing each audio and video stream as a separate file.

33. The computer-readable medium of claim 25, wherein the transcribing further comprises: decompressing at least some of the initially stored multiple simultaneous audio streams, mixing the decompressed audio streams, and encoding the mixed audio.

34. The computer-readable medium of claim 33, wherein the encoding includes encoding the mixed audio at a higher bit rate than a bit rate of the initially stored audio.

35. The computer-readable medium of claim 34, wherein the step of transcribing further comprises: encoding the mixed audio with video data according to said standard format.

36. The computer-readable medium of claim 25, further comprising the step of notifying after the standard format recording has been stored.

37. The computer-readable medium of claim 36, wherein the notifying step includes sending at least one email.

* * * * *

UNITED STATES PATENT AND TRADEMARK OFFICE
CERTIFICATE OF CORRECTION

PATENT NO. : 6,674,459 B2
DATED : January 6, 2004
INVENTOR(S) : Ben-Shachar et al.

It is certified that error appears in the above-identified patent and that said Letters Patent is hereby corrected as shown below:

Column 4,
Line 62, "communication-modes" should read -- communication modes --.

Column 10,
Line 59, "being,conducted" should read -- being conducted --.

Column 12,
Lines 20 and 37, "requester" should read -- requestor --.

Signed and Sealed this

Twentieth Day of July, 2004

JON W. DUDAS
*Acting Director of the United States Patent and Trademark Office*